(12) United States Patent
Kudose et al.

(10) Patent No.: US 11,783,660 B2
(45) Date of Patent: Oct. 10, 2023

(54) AUTOMATIC COLUMN SETTING DEVICE FOR ARTICLE VENDING MACHINE

(71) Applicant: SANDEN RETAIL SYSTEMS CORPORATION, Isesaki (JP)

(72) Inventors: Hiroshi Kudose, Isesaki (JP); Kazuya Sembongi, Isesaki (JP); Hironori Ito, Isesaki (JP); Nobuyuki Takayama, Isesaki (JP); Hideki Sadakata, Isesaki (JP); Tatsuya Hirose, Isesaki (JP)

(73) Assignee: SANDEN RETAIL SYSTEMS CORPORATION, Gunma (JP)

( * ) Notice: Subject to any disclaimer, the term of this patent is extended or adjusted under 35 U.S.C. 154(b) by 253 days.

(21) Appl. No.: 17/293,011

(22) PCT Filed: Nov. 11, 2019

(86) PCT No.: PCT/JP2019/044112
§ 371 (c)(1),
(2) Date: May 11, 2021

(87) PCT Pub. No.: WO2020/100805
PCT Pub. Date: May 22, 2020

(65) Prior Publication Data
US 2021/0398382 A1 Dec. 23, 2021

(30) Foreign Application Priority Data
Nov. 13, 2018 (JP) ................. 2018-213260

(51) Int. Cl.
*G07F 11/04* (2006.01)
*B65G 1/08* (2006.01)
*G06Q 20/18* (2012.01)

(52) U.S. Cl.
CPC ............. *G07F 11/04* (2013.01); *B65G 1/08* (2013.01); *G06Q 20/18* (2013.01); *B65G 2207/30* (2013.01)

(58) Field of Classification Search
CPC .................... G07F 9/02; G07F 9/026
(Continued)

(56) References Cited

U.S. PATENT DOCUMENTS

2006/0074523 A1* 4/2006 Chirnomas .......... G07F 11/004
700/232
2014/0151391 A1* 6/2014 Jo ...................... G07F 11/42
221/13

FOREIGN PATENT DOCUMENTS

JP 081684/1983 6/1983
JP H 5-81533 4/1993
(Continued)

*Primary Examiner* — Timothy R Waggoner
(74) *Attorney, Agent, or Firm* — Cozen O'Connor

(57) ABSTRACT

Provided is an automatic column setting device for an article vending machine. The device is for an article vending machine 1 including a column in an article storing shelf 13, to store articles arranged in a front-rear direction, and a dispensing mechanism 55 removably installed for the column in the shelf 13, to sequentially dispense the stored articles, the mechanism 55 is arbitrarily installable at a plurality of preset right and left positions in the shelf 13, and the automatic column setting device includes a motor presence/absence information preparing section 81 that detects an installation position of motor 61 in accordance with a connected state of motor 61, and a pattern extracting section 82 that determines a type and an installation position of the mechanism 55 in the shelf 13 based on presence/absence information of motor 61 that is detected by the motor presence/absence information preparing section 81.

7 Claims, 17 Drawing Sheets

(58) Field of Classification Search
USPC .......................................................... 700/242
See application file for complete search history.

(56) References Cited

FOREIGN PATENT DOCUMENTS

| | | |
|---|---|---|
| JP | 2822359 | 9/1998 |
| JP | 2004-206667 | 7/2004 |
| JP | 2005-056383 | 3/2005 |
| JP | 2009-223379 | 10/2009 |
| JP | 2011-221611 | 11/2011 |
| JP | 2013-134624 | 7/2013 |

* cited by examiner

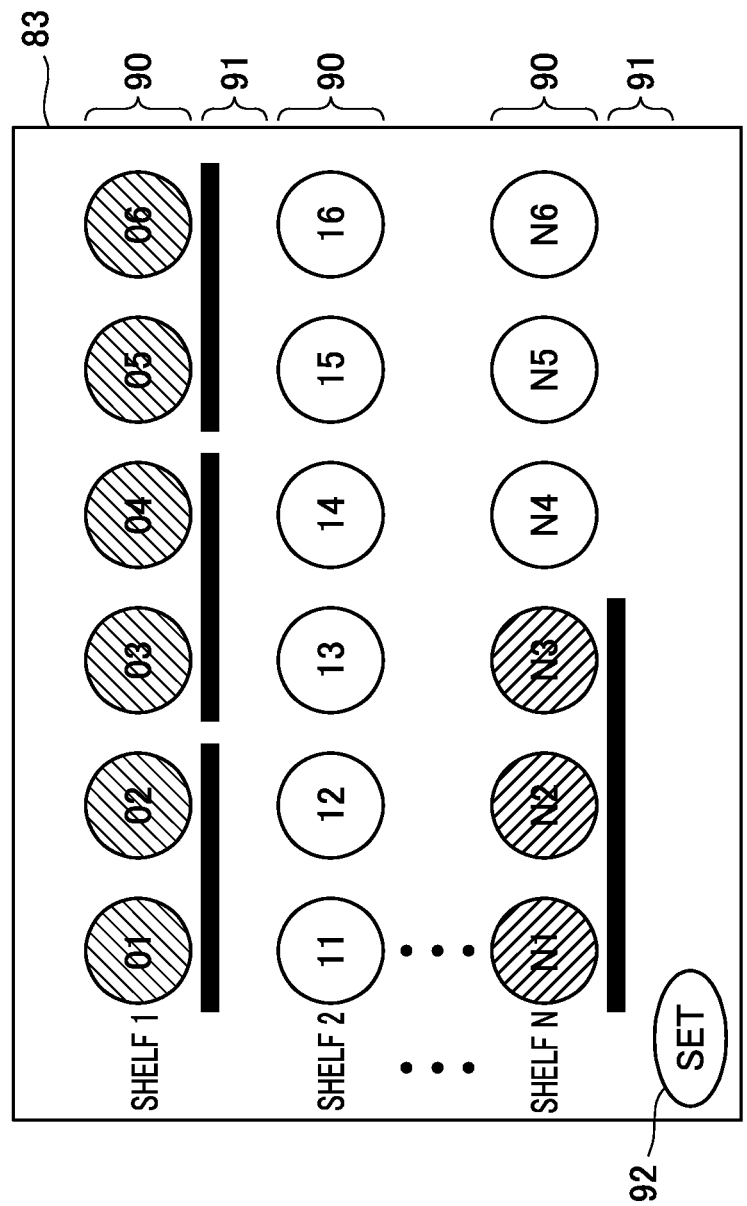

FIG. 17

|   | No | 6 continuous shelves ||||||  |
|---|---|---|---|---|---|---|---|---|
|   |   | 01 | 02 | 03 | 04 | 05 | 06 |   |
| S | 1 | O(S) | O(S) | O(S) | O(S) | O(S) | O(S) |   |
| S+D | 2 | O(S) | O(S) | O(S) | O(S) | O(D) | ●(D) |   |
|   | 3 | O(S) | O(S) | O(S) | O(D) | ●(D) | O(S) |   |
|   | 4 | O(S) | O(S) | O(D) | ●(D) | O(S) | O(S) |   |
|   | 5 | O(S) | O(D) | ●(D) | O(S) | O(S) | O(S) |   |
|   | 6 | O(D) | ●(D) | O(S) | O(S) | O(S) | O(S) |   |
|   | 7 | O(S) | O(S) | O(D) | ●(D) | O(D) | ●(D) | J |
|   | 8 | O(S) | O(D) | ●(D) | O(S) | O(D) | ●(D) |   |
|   | 9 | O(D) | ●(D) | O(S) | O(S) | O(D) | ●(D) |   |
|   | 10 | O(S) | O(D) | ●(D) | O(D) | ●(D) | O(S) |   |
|   | 11 | O(D) | ●(D) | O(S) | O(D) | ●(D) | O(S) |   |
|   | 12 | O(D) | ●(D) | O(D) | ●(D) | O(S) | O(S) | K |
| D | 13 | O(D) | ●(D) | O(D) | ●(D) | O(D) | ●(D) | L |
| S+TA | 14 | O(S) | O(S) | O(S) | O(TA) | ●(TA) | ●(TA) |   |
|   | 15 | O(S) | O(S) | O(TA) | ●(TA) | ●(TA) | O(S) |   |
|   | 16 | O(S) | O(TA) | ●(TA) | ●(TA) | O(S) | O(S) |   |
|   | 17 | O(TA) | ●(TA) | ●(TA) | O(S) | O(S) | O(S) |   |
| S+D+TA | 18 | O(S) | O(D) | ●(D) | O(TA) | ●(TA) | ●(TA) |   |
|   | 19 | O(S) | O(TA) | ●(TA) | ●(TA) | O(D) | ●(D) | M |
|   | 20 | O(D) | ●(D) | O(S) | O(TA) | ●(TA) | ●(TA) |   |
|   | 21 | O(D) | ●(D) | O(TA) | ●(TA) | ●(TA) | O(S) |   |
|   | 22 | O(TA) | ●(TA) | ●(TA) | O(S) | O(D) | ●(D) |   |
|   | 23 | O(TA) | ●(TA) | ●(TA) | O(D) | ●(D) | O(S) | N |
| S+TB | 24 | O(S) | O(S) | O(S) | ●(TB) | O(TB) | ●(TB) | J |
|   | 25 | O(S) | O(S) | ●(TB) | O(TB) | ●(TB) | O(S) |   |
|   | 26 | O(S) | ●(TB) | O(TB) | ●(TB) | O(S) | O(S) | K |
|   | 27 | ●(TB) | O(TB) | ●(TB) | O(S) | O(S) | O(S) |   |
| S+D+TB | 28 | O(S) | O(D) | ●(D) | ●(TB) | O(TB) | ●(TB) | M |
|   | 29 | O(S) | ●(TB) | O(TB) | ●(TB) | O(D) | ●(D) | L |
|   | 30 | O(D) | ●(D) | O(S) | ●(TB) | O(TB) | ●(TB) | L |
|   | 31 | O(D) | ●(D) | ●(TB) | O(TB) | ●(TB) | O(S) | N |
|   | 32 | ●(TB) | O(TB) | ●(TB) | O(S) | O(D) | ●(D) |   |
|   | 33 | ●(TB) | O(TB) | ●(TB) | O(D) | ●(D) | O(S) |   |
| T | 34 | O(TA) | ●(TA) | ●(TA) | ●(TB) | O(TB) | ●(TB) |   |
|   | 35 | ●(TB) | O(TB) | ●(TB) | O(TA) | ●(TA) | ●(TA) |   |
|   | 36 | O(TA) | ●(TA) | ●(TA) | O(TA) | ●(TA) | ●(TA) |   |
|   | 37 | ●(TB) | O(TB) | ●(TB) | ●(TB) | O(TB) | ●(TB) |   |

AUTOMATIC COLUMN SETTING DEVICE FOR ARTICLE VENDING MACHINE

RELATED APPLICATIONS

This is a U.S. National Phase Application under 35 USC 371 of International Application PCT/JP2019/044112 filed on Nov. 11, 2019.

This application claims the priority of Japanese application no. 2018-213260 filed Nov. 13, 2018, the entire content of which is hereby incorporated by reference.

TECHNICAL FIELD

The present invention relates to a device that automatically sets a column in an article storing shelf in an article vending machine that automatically vends the articles.

BACKGROUND ART

There has been a known article vending machine that stores a plurality of types of articles on shelves provided in a box-shaped cabinet, and automatically dispenses an article selected by a purchaser. For example, an article vending machine (an automatic vending machine) described in Patent Document 1 includes a bucket (a catcher bucket) that moves in an up-down direction in front of a plurality of shelves arranged in the up-down direction in a cabinet, and a dispensing mechanism is used to push an article selected by a purchaser forward from a corresponding shelf to dispense the article into the bucket moved to front of the shelf. Then, in such a structure, the bucket carrying the article thereon is moved to a position opposed to an article outlet located in a lower part of the article vending machine, and the purchaser takes out the article from the article outlet.

Furthermore, in the article vending machine disclosed in Patent Document 1, the shelf is divided into a plurality of shelves in a right-left direction, to form columns arranged in the right-left direction. In each column, articles are arranged in a front-rear direction, and respective columns include dispensing mechanisms including spirals that are spiral rod-shaped parts, respectively. This spiral has an axis extending in the front-rear direction, and the article is supported in a clamped manner between loops of the spiral. The spiral is configured to be rotated with a motor provided in a rear part of the spiral, to move the article forward.

On the other hand, in Patent Document 2, disclosed is an article vending machine having a test function of determining whether or not various electric actuators such as a motor of the article vending machine normally operate. In the article vending machine of Patent Document 2, a failure such as a harness connection failure is determined based on a value of current in operating each electric actuator for a predetermined time.

PRIOR ART DOCUMENT

Patent Document

Patent Document 1: Publication of Japanese Patent Laid-Open No. 1993-081533
Patent Document 2: Publication of Japanese Patent No. 2822359

SUMMARY OF THE INVENTION

Problems to be Solved by the Invention

Some article vending machines that can store articles having different sizes allow selection of a width and position of a column from a plurality of predetermined widths and positions in each shelf. When the width and position of the column are changed in this manner, a number of columns in a shelf may be changed, and accordingly a position of a dispensing mechanism is also changed.

However, when the number of the columns and the position of the corresponding column are changed in this manner, it is necessary to perform a column setting operation of changing an operation switch of an operation panel in accordance with the position of the column and matching the column with the operation switch. Then, it is necessary to execute this column setting operation every time a manager changes the column, and there is a need for facilitating the setting.

An object of the present invention, which has been made in view of such problems as described above, is to provide an automatic column setting device for an article vending machine that facilitates a column setting operation, in the article vending machine in which a number or positions of a plurality of columns in a shelf can be changed.

Means for Solving the Problems

In order to achieve the above object, an aspect of the present invention is directed to an automatic column setting device for an article vending machine, the article vending machine including a plurality of columns provided to be arranged in a right-left direction in an article storing shelf, each of the columns configured to store articles arranged in a front-rear direction, and a dispensing mechanism removably installed in the shelf, to sequentially dispense the articles stored in each of the columns based on a vending command, the dispensing mechanism being arbitrarily installable at a plurality of preset right and left positions in the shelf, the automatic column setting device for the article vending machine, including a position detector that detects an installation position of the dispensing mechanism in the shelf, and a determining section that determines a setting situation of the column in the shelf based on the installation position of the dispensing mechanism that is detected by the position detector.

Preferably, the dispensing mechanism may include a drive section, and a dispensing section installed to occupy one column or a plurality of adjacent columns, the dispensing mechanism to be installed by being selected from a plurality of types of dispensing mechanisms that are different in a number of the columns to be occupied by the dispensing section or a relative position of the drive section to the dispensing section, the position detector may detect presence/absence of the installed drive section for each column as the installation position of the dispensing mechanism, and the determining section may determine the type and installation position of the dispensing mechanism as the setting situation of the column based on information on the presence/absence of the installed drive section detected by the position detector.

Preferably, the automatic column setting device may include a warning section that makes warning, in a case where the setting situation of the column is determined in a plurality of patterns.

Preferably, the automatic column setting device may include a display section that displays setting situations of a plurality of patterns, in a case where the determining section determines the setting situation of the column in the plurality of patterns.

Preferably, the automatic column setting device may include a selecting section that selects and determines an actual setting situation of the column from the setting situations of the plurality of patterns displayed in the display section.

Preferably, the automatic column setting device may include a control section that controls the display section to display information of the articles stored in the column, and an operation button to purchase the article, based on the setting situation of the column that is determined by the determining section.

Advantageous Effects of the Invention

According to the present invention, an installation position of a dispensing mechanism in a shelf is detected by a position detector, and a setting situation of the column in the shelf is determined based on the installation position of the detected dispensing mechanism, so that a column setting operation can be easily performed.

BRIEF DESCRIPTION OF THE DRAWINGS

FIG. 16 is another display example in the operation panel after the combination determination.

FIG. 17 is a list table of column patterns in the present embodiment.

MODE FOR CARRYING OUT THE INVENTION

Hereinafter, description will be made in detail as to an embodiment of the present invention with reference to the drawings.

Figure 1:
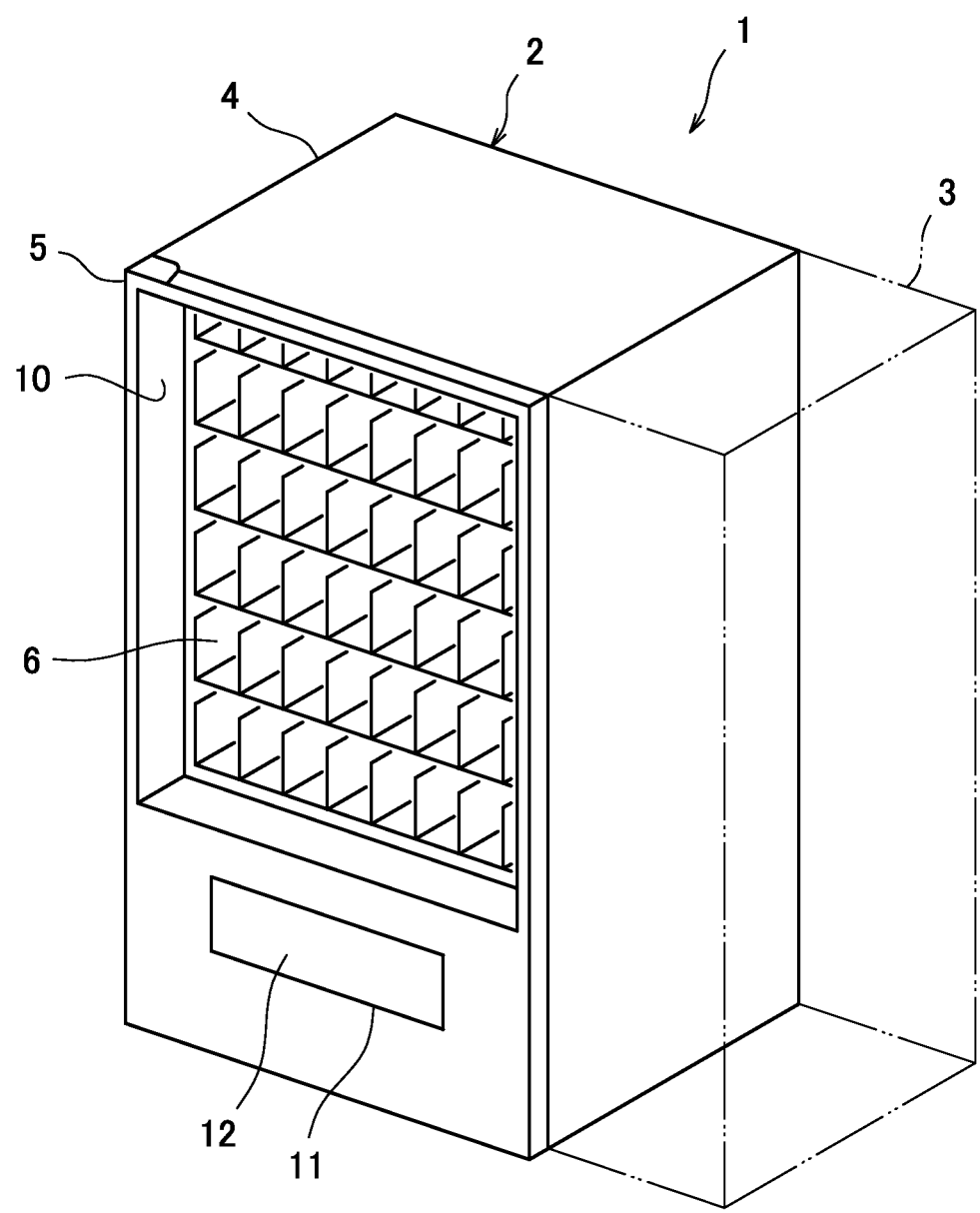
FIG. 1 is a perspective view showing a schematic exterior shape of an article vending machine of an embodiment of the present invention.
Figure 2:
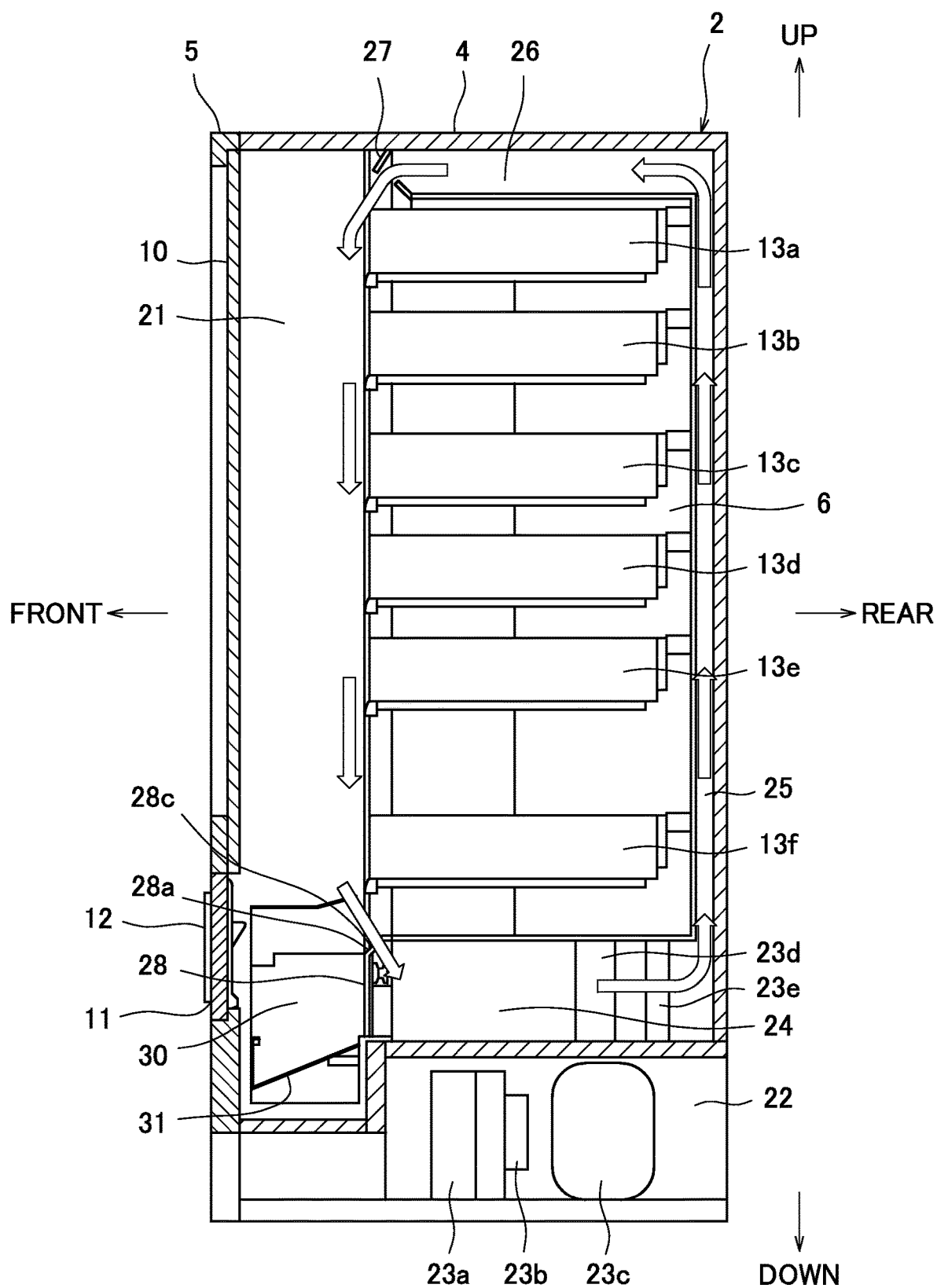
FIG. 2 is a vertical cross-sectional view showing an interior structure of the article vending machine of the present embodiment.

FIG. 1 is a perspective view showing a schematic exterior shape of an article vending machine of the present embodiment. FIG. 2 is a vertical cross-sectional view showing an interior structure of the article vending machine.

As shown in FIG. 1, an article vending machine 1 includes a main body unit 2 that stores articles, and an operation unit 3.

The main body unit 2 includes a box-shaped cabinet 4 formed in a box shape having an opened front surface, and including a door 5 that openably/closably covers a front surface opening. Furthermore, an article storage section 6 that stores the articles is provided inside the cabinet 4.

The operation unit 3 is disposed adjacent to a side of the main body unit 2, and includes a selecting switch of an article, and a billing section that performs acceptance or payment of charges by bills, coins or the like, or payment by card. The operation unit 3 transmits a vending command to the main body unit 2 in response to the payment of the charges performed in the billing section and a selecting operation of the article performed with the selecting switch.

As shown in FIGS. 1 and 2, an upper part of a front surface of the door 5 of the main body unit 2 is configured such that the interior can be viewed through a transparent plate 10 made of transparent glass or resin. In a lower part of the door 5, a rectangular article outlet 11 (an outlet) is provided. In the article outlet 11, a rectangular plate-like outlet shutter 12 is provided. The outlet shutter 12 is supported swingably in a front-rear direction in an upper edge portion of the article outlet 11. The outlet shutter 12 closes the article outlet 11 at a closing position extending in an up-down direction, and has a lower part swung rearward from this closing position, to open the article outlet 11.

The article storage section 6 in the cabinet 4 is configured such that a plurality of (e.g., six) shelves 13a to 13f each having an opened front part are arranged at a distance in the up-down direction. The shelf 13f of a bottom row in the article storage section 6 stores articles that are comparatively large in the up-down direction, such as PET bottle beverages, and the shelf 13a in a top row stores articles that are comparatively small in the up-down direction.

A space where a bucket 30 moves (hereinafter, referred to also as a bucket moving space 21) is provided in the front-rear direction between a front end portion of each of the shelves 13a to 13f and the transparent plate 10 that is the front surface of the door 5.

The bucket 30 is formed with about the same length as in each of the shelves 13a to 13f in a right-left direction, and configured to be movable in the bucket moving space 21 in the up-down direction. The bucket 30 is moved in the up-down direction by an unshown actuator provided inside the door 5, and a rear end portion of a bottom plate 31 of the bucket 30 is movable to upper and lower positions of a bottom plate of each of the shelves 13a to 13f. The bucket is movable so that the rear end portion of the bottom plate is located below a lower surface of the shelf 13f of the bottom row when the bucket is moved to a bottom. Note that a position of the bucket 30 moved to the bottom is a standby/outlet position. At this standby/outlet position, the article outlet 11 is located at a front surface of the bucket 30, and one can open the outlet shutter 12 and put one's hand into the bucket 30.

Inside the main body unit 2, a machine room 22 is disposed below the article storage section 6. In the machine room 22, a condenser 23a of cooling equipment by refrigeration cycle, a fan 23b for the condenser and a compressor 23c are provided. A front part and a rear pat of the machine room 22 communicate with an exterior. Furthermore, a lower duct 24 is disposed between the machine room 22 and the shelf 13f of the bottom row. The lower duct 24 is provided with an evaporator 23d for the cooling equipment and a fan 23e for the evaporator 23d. The fan 23e generates flow of air passing through the evaporator 23d from front to rear of the lower duct 24.

A rear part of the lower duct 24 communicates with a rear duct 25 extending in the up-down direction behind the article storage section 6. Furthermore, an upper duct 26 extending in the front-rear direction is disposed above the article storage section 6.

A front opening of the upper duct 26 opens toward an upper part of the bucket moving space 21. Additionally, a wind guide plate 27 inclined downward and forward at an angle of, for example, 45 degrees is disposed in an upper edge portion of the front opening of the upper duct.

On the other hand, a back panel 28 is disposed in a front end portion of the lower duct 24. The back panel 28 extends in the up-down direction, and defines the bucket moving space 21 in front of the lower duct 24 together with the duct. Furthermore, in an inclined part 28a that is an upper part of the back panel 28, a plurality of vents 28c each having a diameter of about several millimeters are arranged at a distance of about 1 cm in up-down and right-left directions.

When each component of the cooling equipment is operated, particularly when the fan 23e in the lower duct 24 is operated, as shown by arrows in FIG. 2, cooling air passing through and cooled by the evaporator 23d circulates from the lower duct 24 through the rear duct 25, the upper duct 26, and the bucket moving space 21 to the lower duct 24 in order. Note that part of the cooling air from the rear duct 25 moves forward among the shelves 13a to 13f, to cool the articles stored in the shelves 13a to 13f.

During the movement of the cooling air from the upper duct 26 to the bucket moving space 21, the cooling air is moved downward in a rear part of the bucket moving space 21 via the wind guide plate 27, and the cooling air moves through the vents 28c of the back panel 28 to the lower duct 24. Therefore, the cooling air forms air curtain along front surfaces of the shelves 13a to 13f. Consequently, the cooling air can be inhibited from being in contact with the transparent plate 10 of the door 5, and the transparent plate 10 of the door 5 can be inhibited from fogging up.

Hereinafter, description will be made as to a structure of shelves 13 (13a to 13f) in the article storage section 6 with reference to FIG. 3 to FIG. 7.

Figure 3:
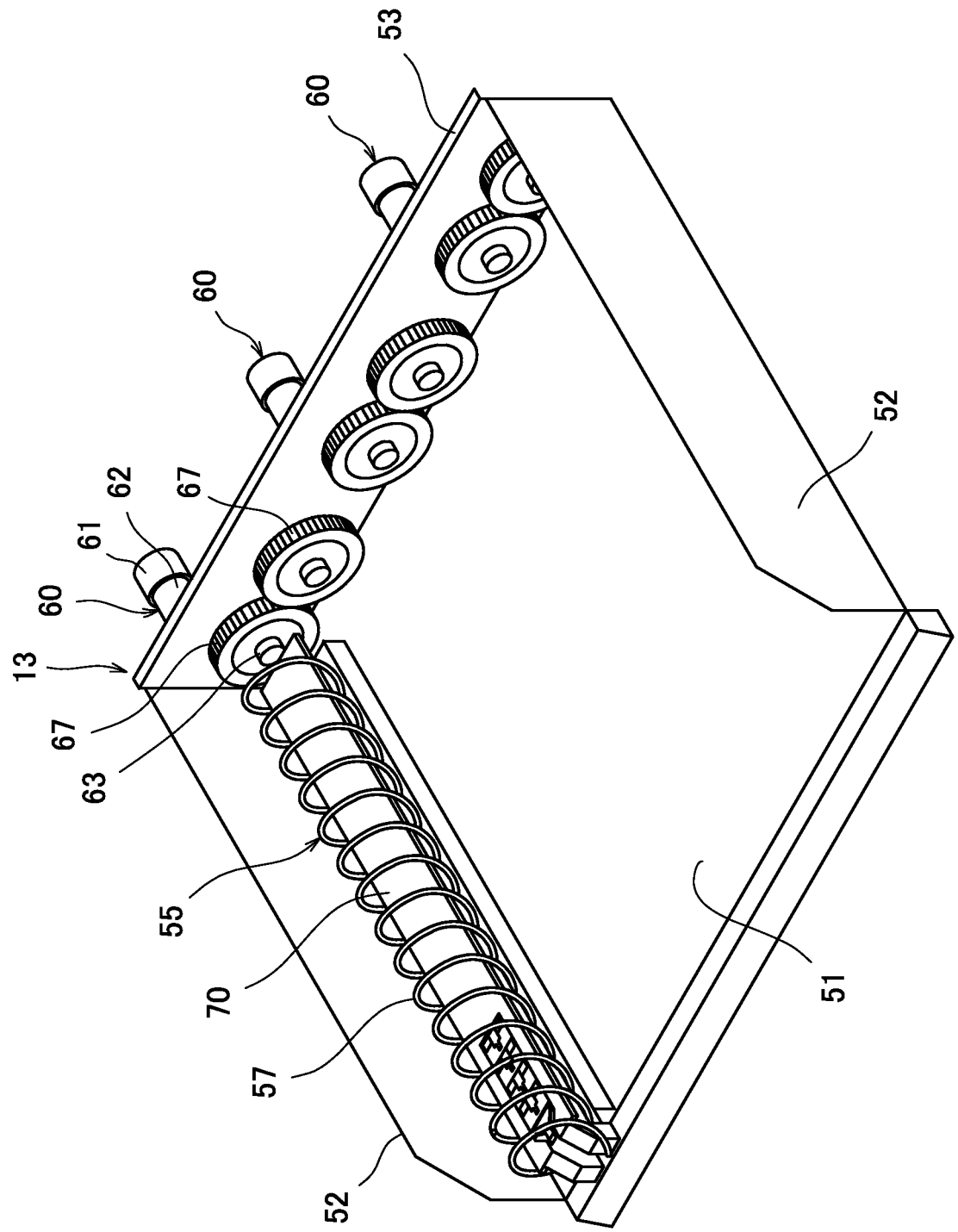
FIG. 3 is a perspective view showing a structure of a shelf of an article storage section in the present embodiment.
Figure 4:
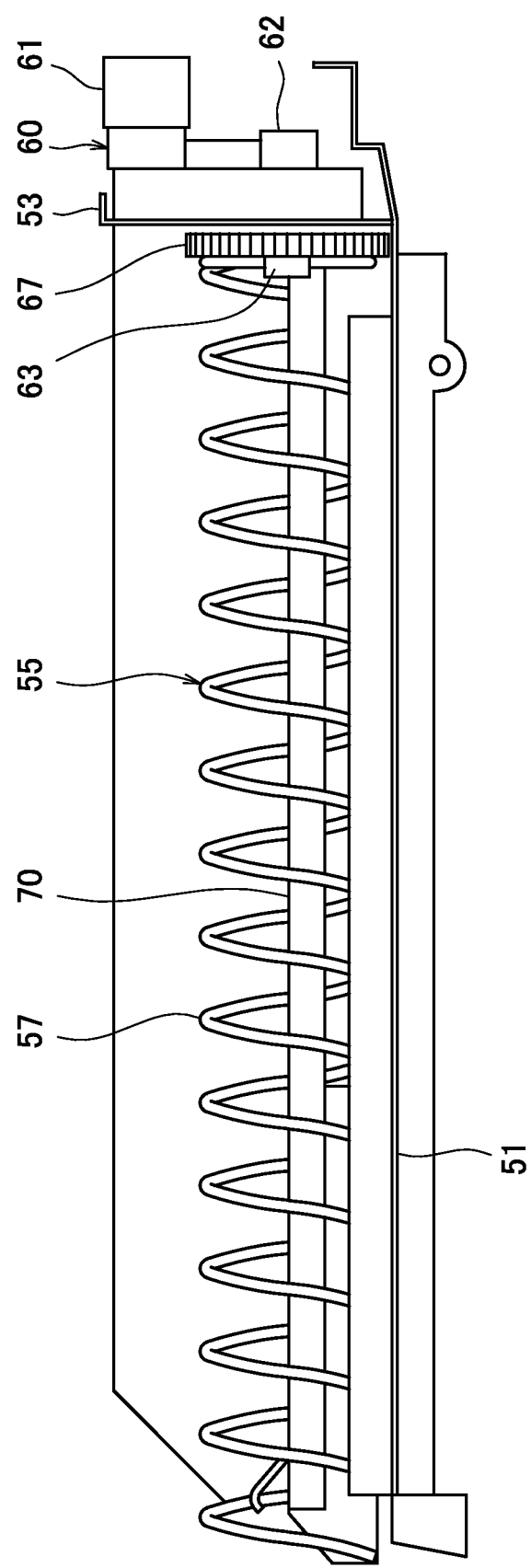
FIG. 4 is a vertical cross-sectional view showing a structure of the shelf of the article storage section in the present embodiment.
Figure 5:
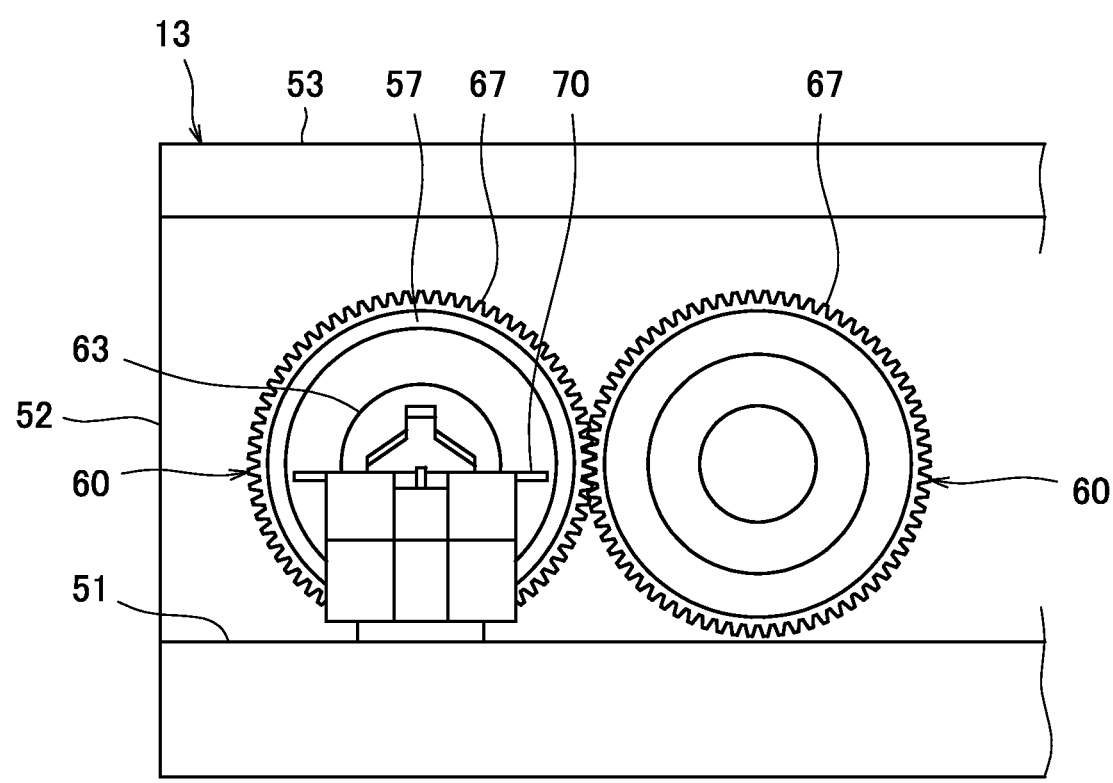
FIG. 5 is a partial front view showing the structure of the shelf of the article storage section in the present embodiment.
Figure 6:
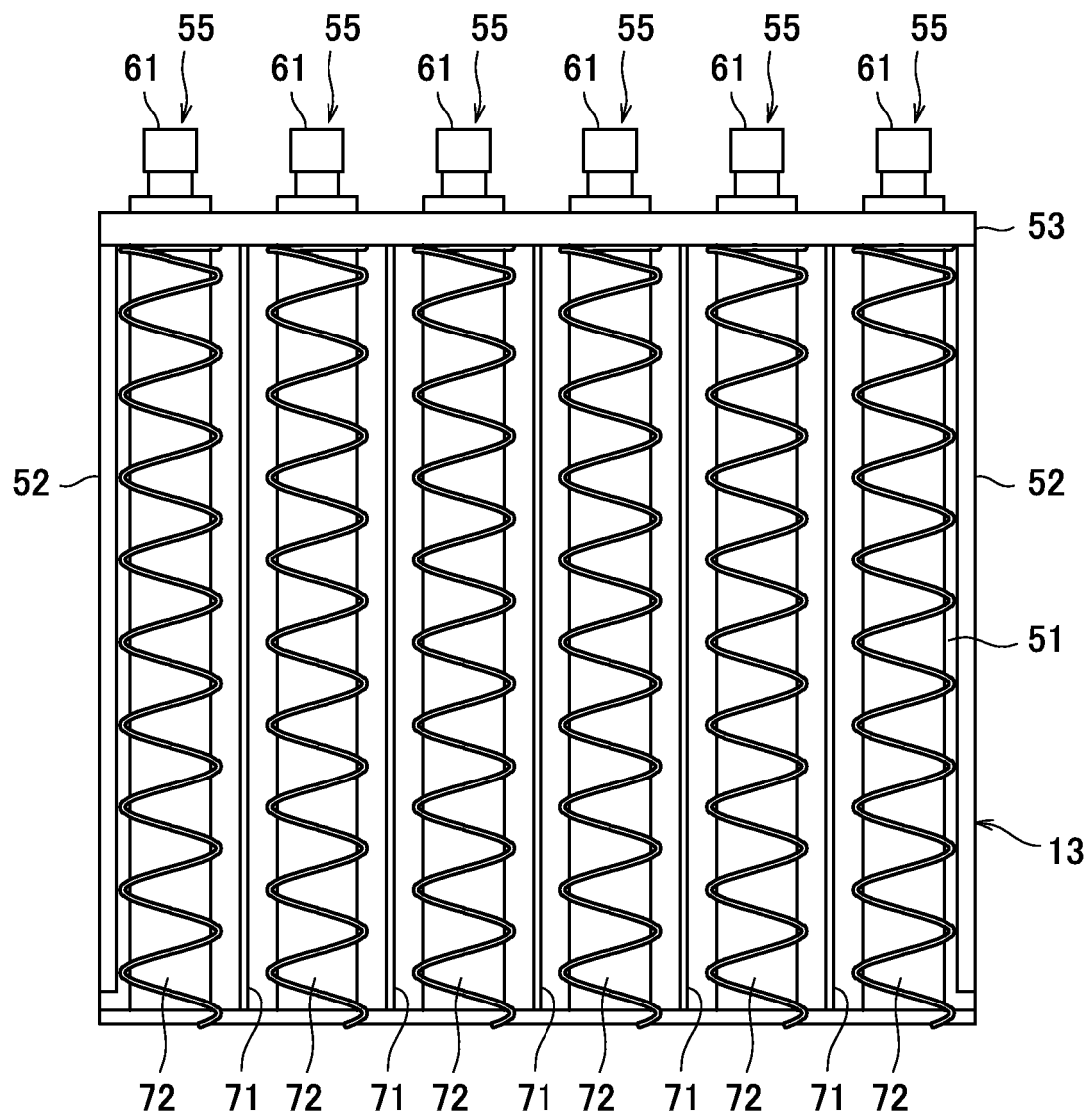
FIG. 6 is a top view showing a structure of a shelf in which all installed dispensing mechanisms are of a single column type.
Figure 7:
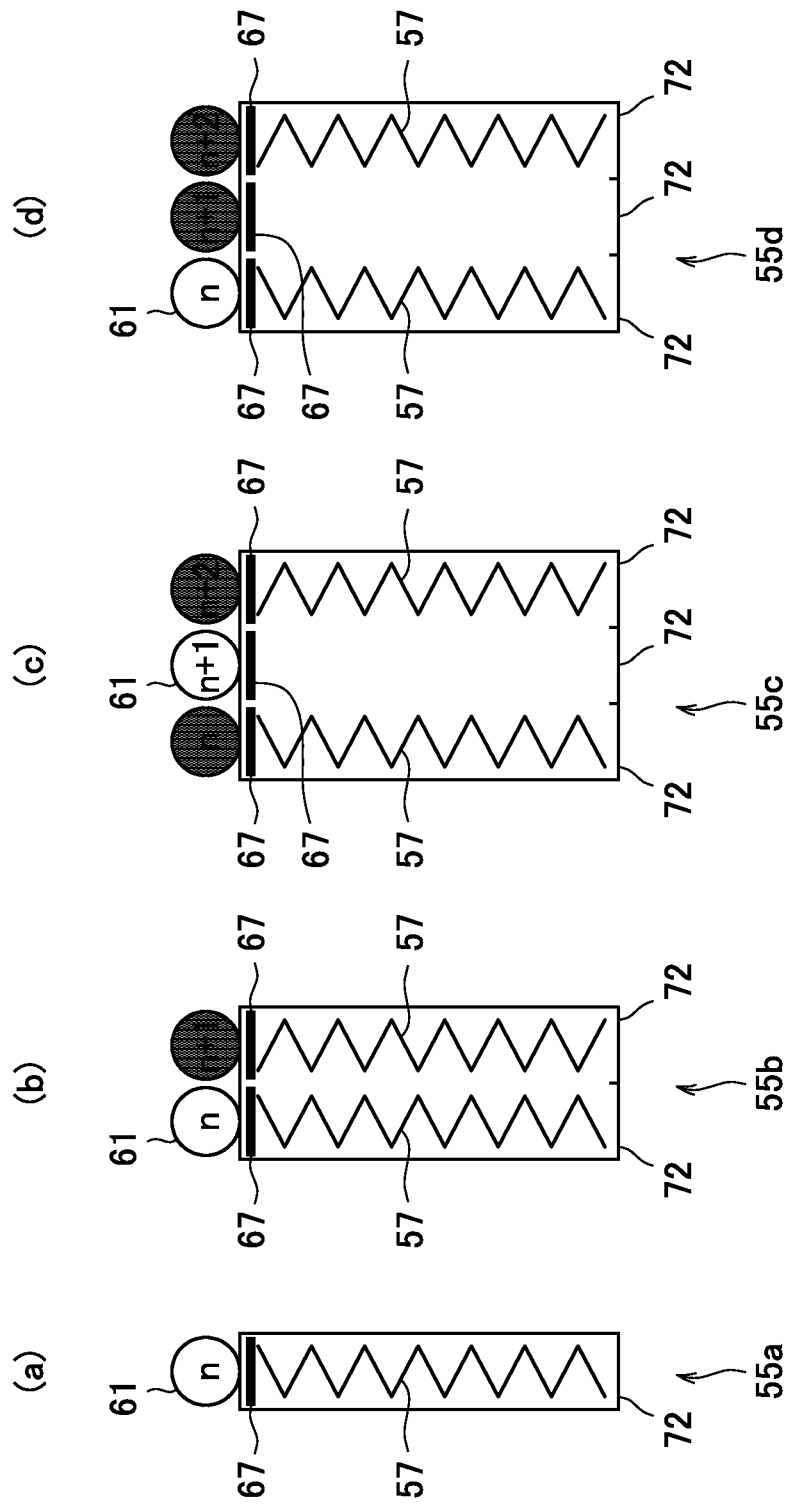
FIG. 7 is a schematic view of each column type of dispensing mechanism for use in the present embodiment.

FIG. 3 is a perspective view showing the structure of each of the shelves 13 of the article storage section 6. FIG. 4 is a vertical cross-sectional view showing the structure of the shelf 13 of the article storage section 6. FIG. 5 is a partial front view showing the structure of the shelf 13 of the article storage section 6. Note that FIG. 3 shows a dispensing mechanism 55 in a state where a partition plate 71 is removed. FIG. 6 is a top view showing a structure of the shelf 13 in which all installed dispensing mechanisms 55 are of a single column type. FIG. 7 is a schematic view of each column type of dispensing mechanism 55 for use in the present embodiment, (a) shows the single column type, (b) shows a double column type, (c) shows a central drive triple column type, and (d) shows a left drive triple column type.

As shown in FIGS. 3 to 5, each of the shelves 13 (13a to 13f) is formed in a box shape including a bottom plate 51, right and left side plates 52 and a back plate 53, and opened upward and forward. Moreover, the shelf 13 includes the dispensing mechanism 55 and an unshown partition plate.

The dispensing mechanism 55 includes a spiral part 57 (a dispensing section) including a spirally formed metal rod having a diameter of several millimeters, and a drive section 60 that drives and rotates the spiral part 57. A length of the spiral part 57 in an axial direction is about the same as a length of the bottom plate 51 in the front-rear direction, and the spiral part is disposed between the unshown partition plates, or between the partition plate and the side plate 52.

A plurality of partition plates extend in the front-rear direction on the bottom plate 51, and are arranged at a distance in the right-left direction between the right and left side plates 52. The partition plates are arbitrarily and removably fixed to a plurality of attachment portions provided on the bottom plate 51 and the back plate 53 of the shelf 13.

The drive section 60 is supported by the back plate 53 of the shelf 13, to fix a rear end portion of the spiral part 57, and drives and rotates the spiral part 57 about an axis of rotation that is an axis of the spiral part 57.

The drive section 60 includes a motor 61 (a drive section), a transmission section 62, and a gear shaft 63.

The transmission section 62 contains a transmission gear, and is disposed on a rear surface side of the back plate 53 of the shelf 13.

The motor 61 is fixed to a rear surface side of an upper part of the transmission section 62. A rear part of the gear shaft 63 extending in the front-rear direction is inserted into and rotatably supported by a lower part of the transmission section 62.

The gear shaft 63 is formed by fixing, to a front end portion of a columnar shaft, a disk-shaped gear 67 having a diameter slightly larger than a diameter of the spiral part 57. A front end portion of the gear shaft 63 protrudes forward from the back plate 53, and the gear 67 is disposed close to and on a front surface side of the back plate 53.

The rear end portion of the spiral part 57 is removably fixed to a front surface of the gear 67. The gear shaft 63, the gear 67 and the spiral part 57 are arranged around the same center line (axis). Then, the motor 61 is driven, to drive and rotate the gear shaft 63 via the transmission gear in the transmission section 62, and the gear 67 and the spiral part 57 are accordingly driven and rotated.

Furthermore, a rectangular box-shaped pedestal 70 extending in parallel with the axis of the spiral part 57 in the front-rear direction is disposed in the spiral part 57. The pedestal 70 is supported on the bottom plate 51 of the shelf 13, and has an upper surface set at about the same position as a position of the axis of the spiral part 57 in the up-down direction.

Note that FIG. 3 shows a configuration that supports and dispenses the articles in a row by two adjacent spiral parts 57 that form a set of dispensing mechanisms. One of these two adjacent spiral parts 57 is not provided with the motor 61. FIG. 3 only shows the spiral part 57 and the pedestal 70 of one of a plurality of dispensing mechanisms 55 provided in the shelf 13, but the other dispensing mechanisms 55 are similarly provided with the spiral parts 57 and the pedestals 70, respectively. Furthermore, in a case where two spiral parts 57 form the dispensing mechanism that dispenses the articles in the row, the gears 67 of two dispensing mechanisms 55 mesh with each other, and a winding direction of the spiral part 57 is reversed to that of the other spiral part.

The article is carried from between front pitches and held by the spiral parts 57 every pitch, on the pedestal 70. Then, the spiral part 57 is rotated by one pitch to move forward the article held by the spiral parts 57, and the article supported at a frontmost position of the spiral part 57 is dispensed forward from the shelf 13. Then, the article dispensed forward from the shelf 13 drops down to the bucket 30 located in the bucket moving space 21.

Note that the dispensing mechanism 55 can be moved in the right-left direction and installed to the back plate 53 of the shelf 13. The dispensing mechanisms 55 adjacent to each other are installed away from each other in the right-left direction so that the gears 67 do not mesh with each other, and hence, the spiral part 57 can be independently rotated and operated.

As shown in FIG. 6, each of the partition plates 71 is installed between the dispensing mechanisms 55 adjacent to each other and including the gears 67 disposed away from each other, and each of the dispensing mechanisms 55 includes the motor 61, so that comparatively small articles can be stored in the respective dispensing mechanisms 55. Note that a space to store the articles in the row between the adjacent partition plates 71 or between the partition plate 71 and the side plate 52 is referred to as a column 72. Furthermore, in a case where the one spiral part 57 forms the dispensing mechanism 55, the mechanism is referred to as the single column type, and in a case where two spiral parts 57 adjacent to each other are used to form the dispensing mechanism 55, the mechanism is referred to as the double column type. In a case where opposite right and left spiral parts 57 among three columns 72 arranged in the right-left direction are used to form the dispensing mechanism 55, the mechanism is referred to as the triple column type.

Note that in the present embodiment, four types of dispensing mechanisms are usable, i.e., a single column type of dispensing mechanism 55*a* shown in FIG. 7(*a*), a left drive double column type of dispensing mechanism 55*b* shown in (b), a central drive triple column type of dispensing mechanism 55*c* shown in (c), and a left drive triple column type of dispensing mechanism 55*d* shown in (d).

As shown in FIG. 7(*a*), in the single column type of dispensing mechanism 55*a*, a column 72 includes a motor 61. That is, a pattern a of presence/absence information of the motor 61 that will be described later indicates that the motor 61 is present in a column number n. Note that the column number n indicates a n-th column 72 from the left.

The left drive double column type of dispensing mechanism 55*b* includes two adjacent spiral parts 57, a motor 61 of a drive section 60 is installed in the left column 72, and the motor 61 is not installed in the right column 72. Note that in the present embodiment, a double column type of dispensing mechanism in which the motor 61 is installed on the right side is not used. As shown in FIG. 7(*b*), in the left drive double column type of dispensing mechanism 55*b*, a pattern b of the presence/absence information of the motor 61 indicates that the motor 61 is present in the column number n and the motor 61 is absent in a column number n+1.

As shown in FIG. 7(*c*), in the central drive triple column type of dispensing mechanism 55*c*, a motor 61 is installed in a central column 72 among three columns 72 arranged in the right-left direction and opposite right and left columns 72 include spiral parts 57, respectively. On the other hand, as shown in FIG. 7(*d*), in the left drive triple column type of dispensing mechanism 55*d*, a motor 61 is installed in a left column 72 among three columns 72 arranged in a right-left direction and opposite right and left columns 72 include spiral parts 57, respectively. Note that a right drive triple column type of dispensing mechanism in which a motor 61 is installed in a right column 72 among three columns 72 arranged in a right-left direction is not used in the present embodiment. As shown in FIG. 7(*c*), in the central drive triple column type of dispensing mechanism 55*c*, a pattern c of the presence/absence information of the motor 61 indicates that the motor 61 is absent in a column number n, the motor 61 is present in a column number n+1, and the motor 61 is absent in a column number n+2. As shown in FIG. 7(*d*), in the left drive triple column type of dispensing mechanism 55*d*, a pattern d of the presence/absence information of the motor 61 indicates that the motor 61 is present in a column number n, the motor 61 is absent in a column number n+1, and the motor 61 is absent in a column number n+2.

Figure 8:
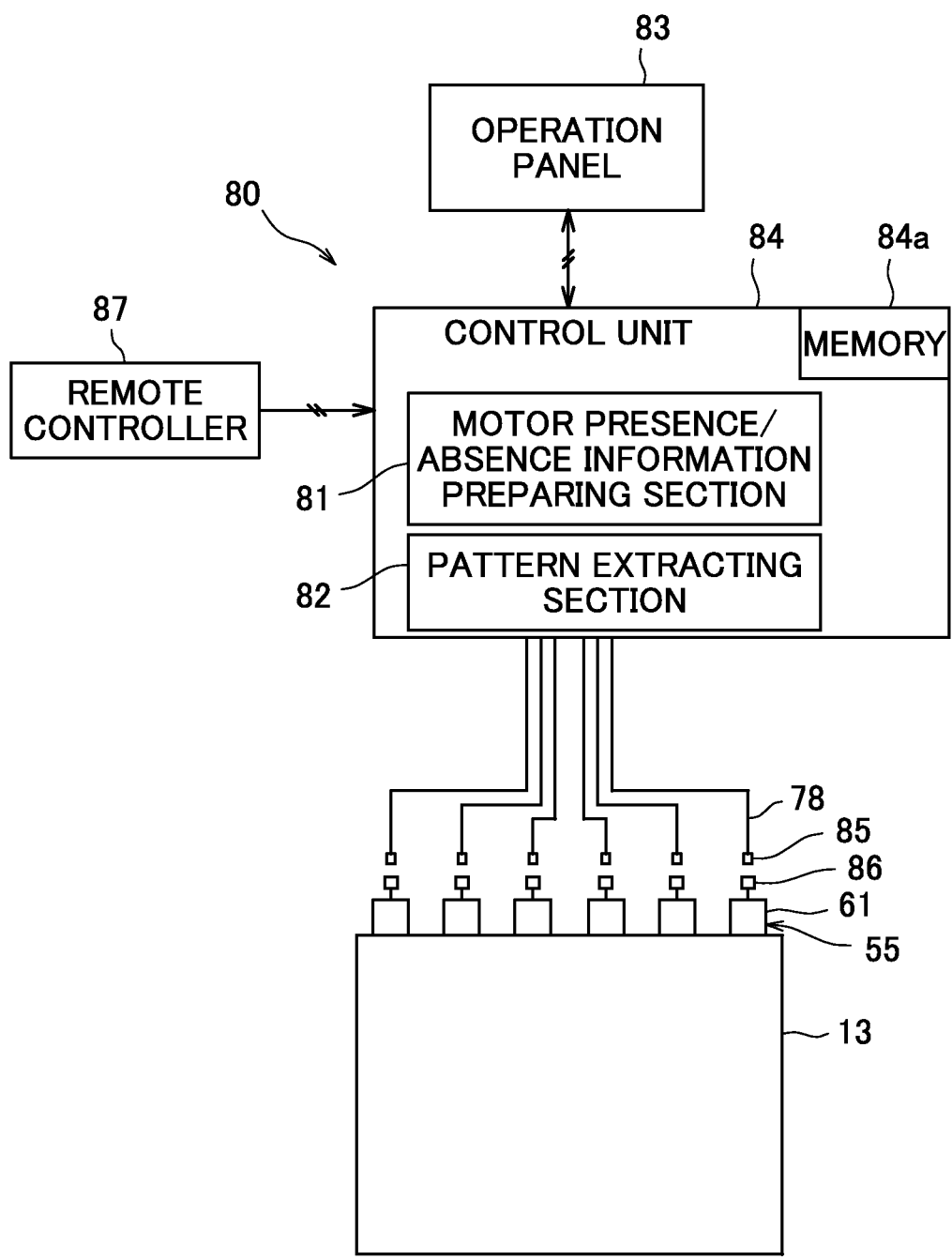
FIG. 8 is a configuration diagram of an automatic column setting device of the present embodiment.

FIG. 8 is a configuration diagram of an automatic column setting device 80 of the present embodiment.

Note that in the present embodiment, one shelf 13 includes six columns 72, and six single column type of dispensing mechanisms 55*a* can be installed. Furthermore, shelves can be installed in six rows.

As shown in FIG. 8, the automatic column setting device 80 includes a motor presence/absence information preparing section 81 (a position detector), a pattern extracting section 82 (a determining section) and an operation panel 83 (a display section, a warning section, and a selecting section).

The motor presence/absence information preparing section 81 and the pattern extracting section 82 are provided in a control unit 84 (a control section) that controls the whole article vending machine.

The operation panel 83 is a device provided in, for example, the operation unit 3, constituted of a liquid crystal panel, and configured to perform a selecting operation in vending the article.

The article storage section 6 of the cabinet 4 includes connectors 85 to supply drive power to the motors 61 of the dispensing mechanisms 55 installed in the respective shelves 13, respectively. For example, in the present embodiment, in a case where the shelves 13 can be installed in six rows, and each shelf 13 includes six dispensing mechanisms 55, 6×6=36 connectors 85 are provided. The respective connectors 85 are connected to the control unit 84 via power supply lines 78, respectively, and power is supplied to each connector via the control unit 84.

Each connector 85 is provided with a marking indicating a number (first to sixth) from the left of the shelf 13 in a row number (first to sixth rows).

The motor 61 of the dispensing mechanism 55 includes a connector 86 to be connected to one connector 85.

Furthermore, an installation position of the motor 61 of the shelf 13 is also provided with a marking indicating, for example, a number (first to sixth) from the left.

Then, for example, in a case where a manager arbitrarily sets the single column type or double column type of dispensing mechanism 55 in accordance with a size of the article to be stored in the shelf 13, the manager further connects the connector 85 corresponding to the installation position of the motor 61 in the shelf 13 to the connector 86 of each motor 61 in order to drive the motor 61.

The control unit 84 includes an input/output device, a storage device (a memory 84*a*) (a ROM, a RAM, a non-volatile RAM or the like), a central processing unit (CPU), a timer and the like. The control unit 84 inputs an operation signal of each type of switch displayed in the operation panel 83, and a value of current flowing through each motor 61, and displays a detection result and set state of the motor, a setting switch and a setting result in the operation panel 83.

Additionally, a remote controller 87 is removably connected to the control unit 84. The remote controller 87 displays all or some of display contents and operation switches in the operation panel 83, and is used to perform alternatives for all or some of functions of the operation panel 83.

Figure 9:
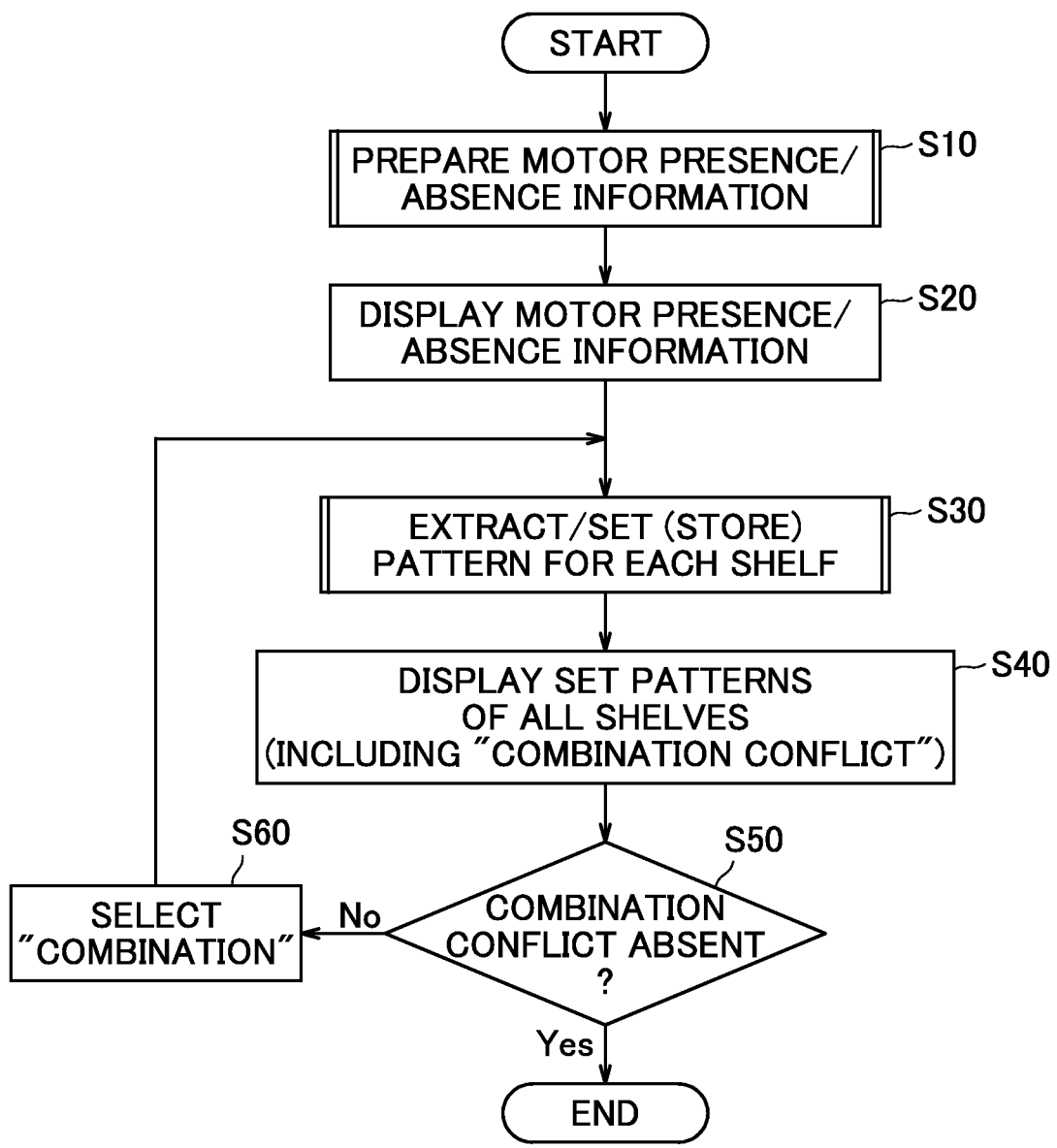
FIG. 9 is a flowchart showing an automatic column setting control procedure.

FIG. 9 is a flowchart showing an automatic column setting control procedure to be executed in the control unit 84. FIG.

Figure 11:
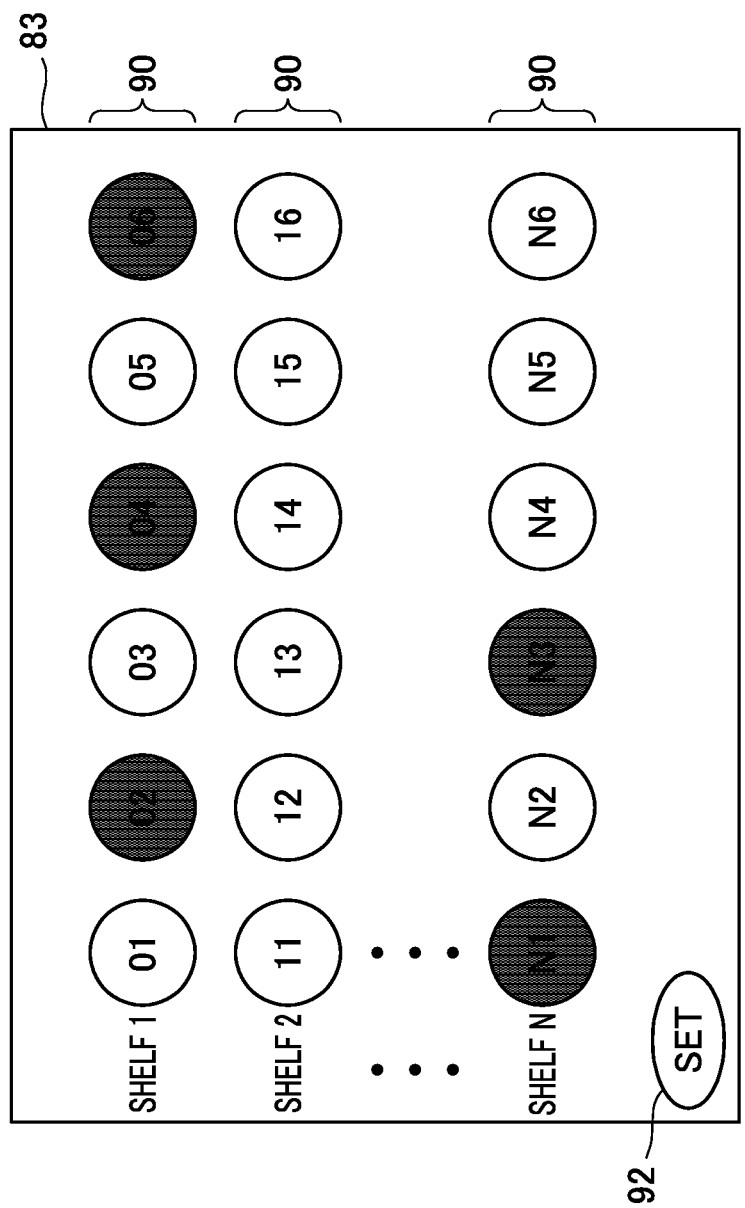
FIG. 11 is a display example of motor presence/absence information in an operation panel.
Figure 12:
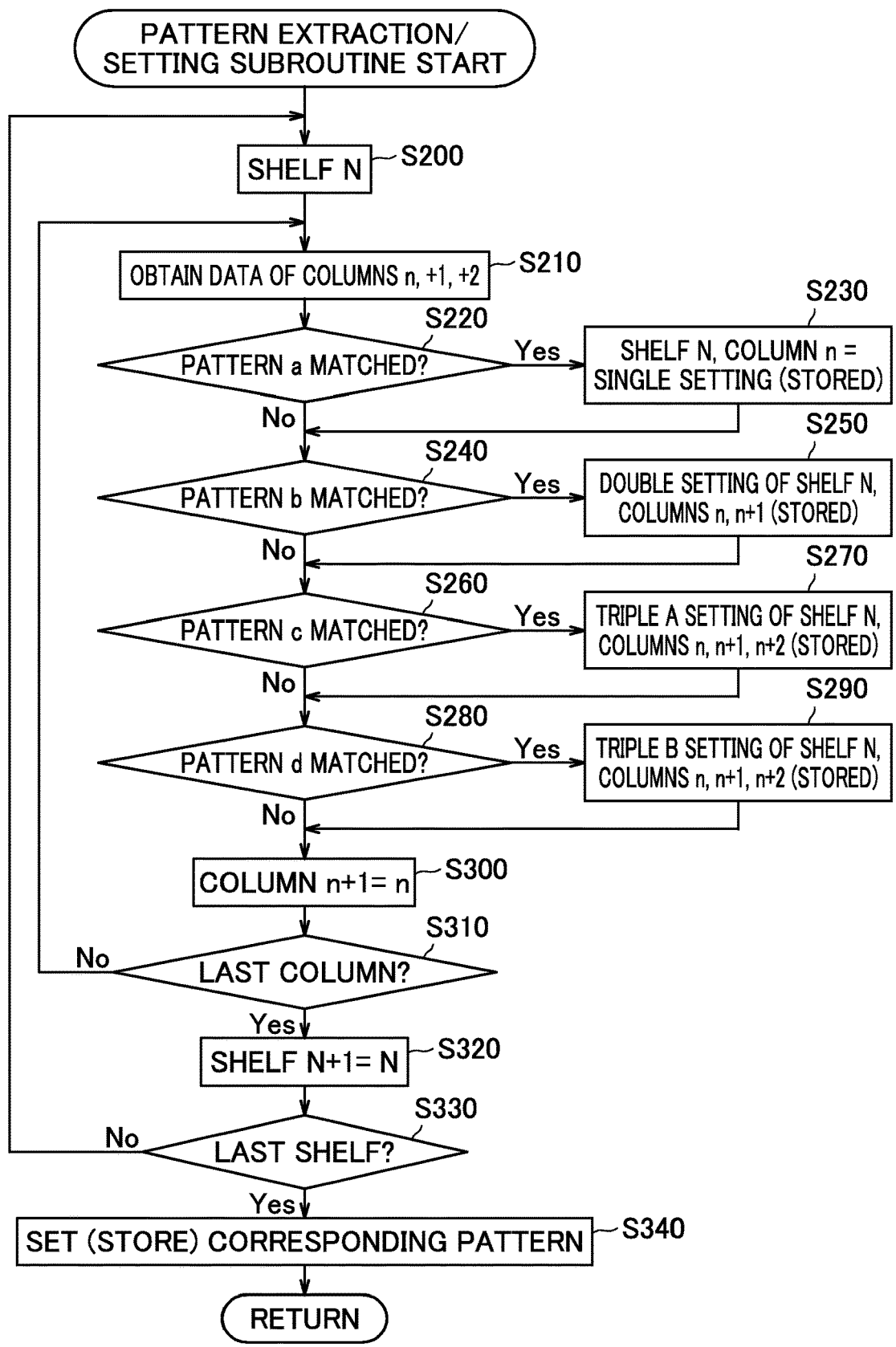
FIG. 12 is a flowchart showing a control procedure in a pattern extraction/setting subroutine.
Figure 13:
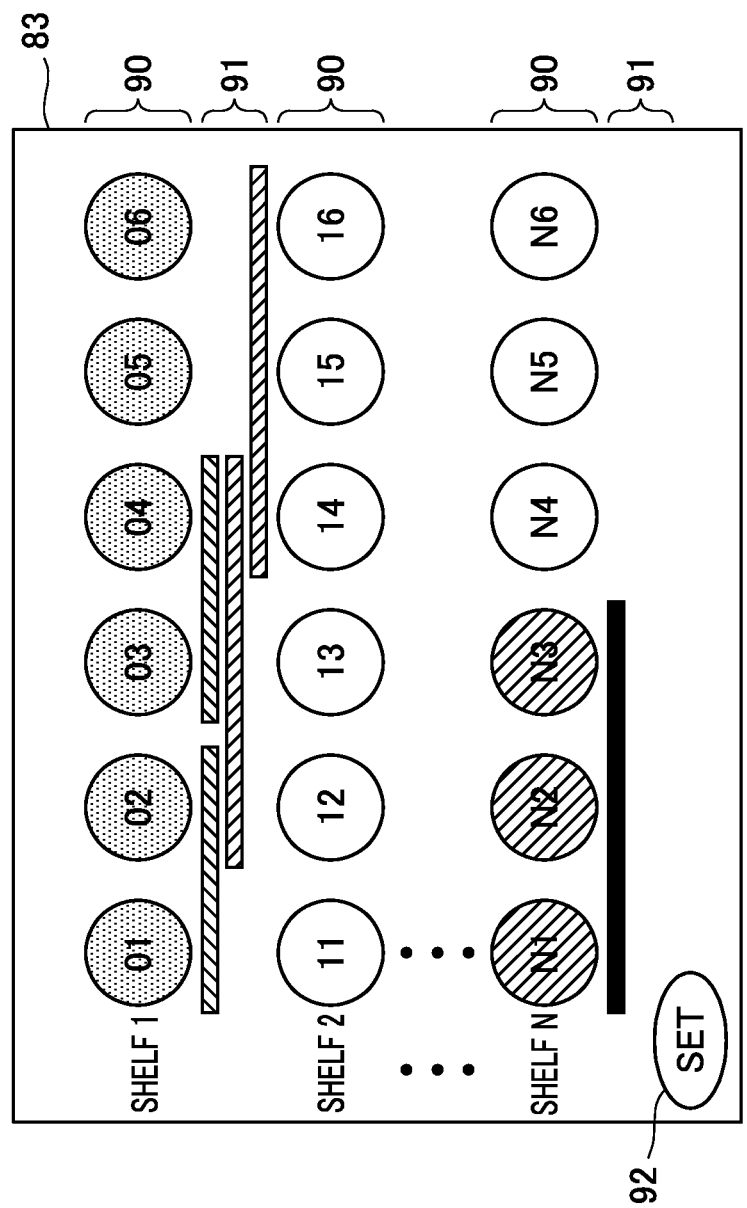
FIG. 13 is a display example in the operation panel after pattern extraction.
Figure 14:
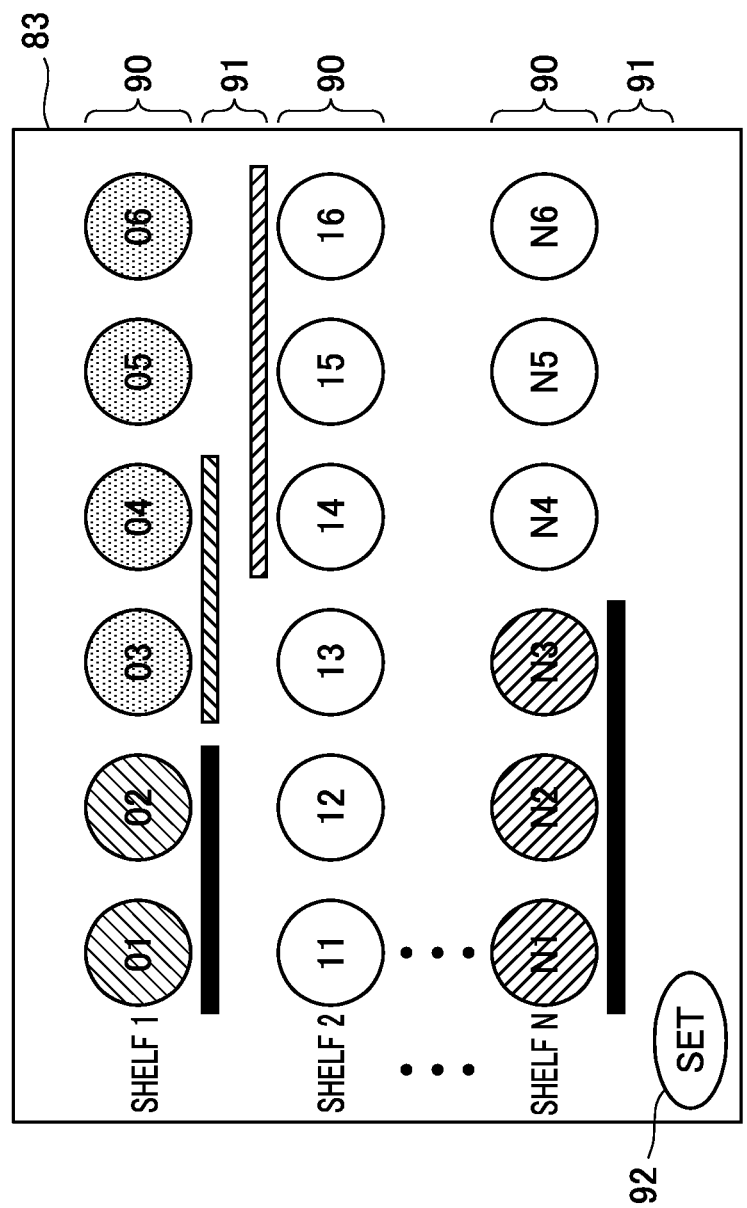
FIG. 14 is a display example in the operation panel during combination selection.
Figure 15:
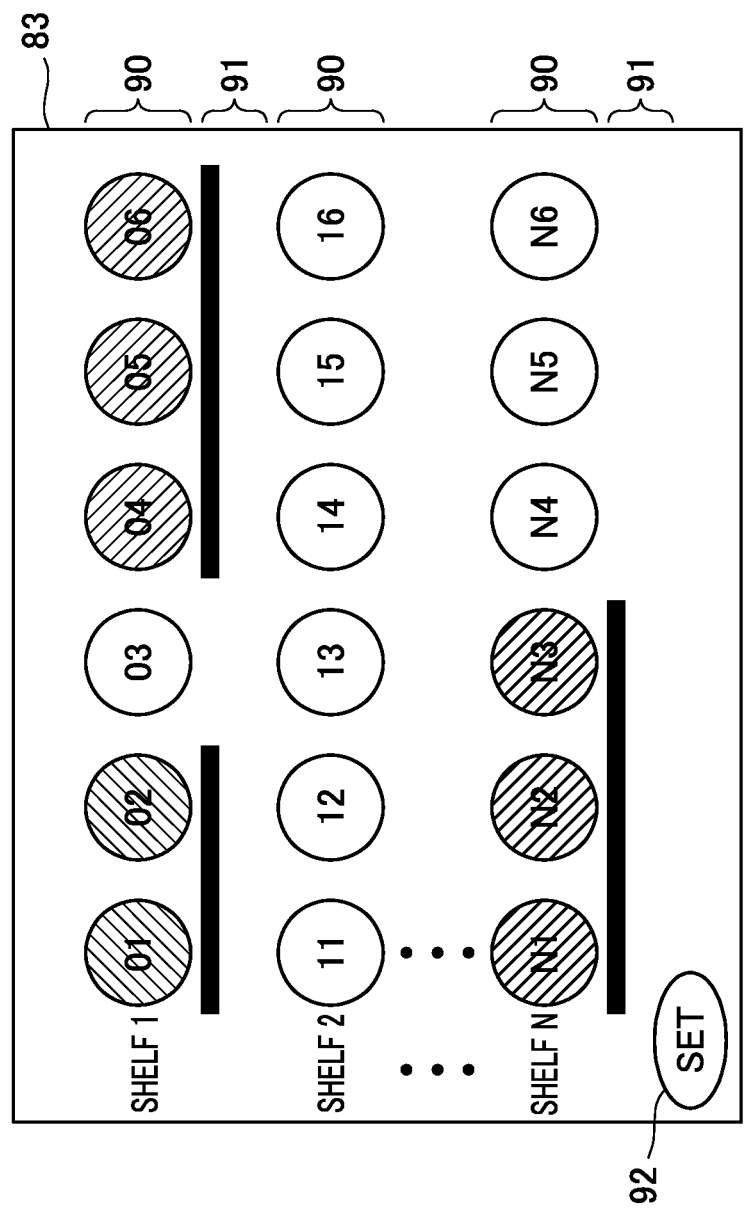
FIG. 15 is a display example in the operation panel after the combination determination.

10 is a flowchart showing a control procedure in a motor presence/absence information preparing subroutine. FIG. 11 is a display example of motor presence/absence information in the operation panel 83. FIG. 12 is a flowchart showing a control procedure in a pattern extraction/setting subroutine. FIG. 13 is a display example in the operation panel 83 after pattern extraction. FIG. 14 is a display example in the operation panel 83 during combination selection. FIG. 15 is a display example in the operation panel 83 after combination determination. FIG. 16 is another display example in the operation panel 83 after the combination determination. FIG. 17 is a list table of column patterns in the present embodiment.

Automatic column setting control shown in FIG. 9 is started to be executed by connecting the connector 86 of the motor 61 to the connector 85 corresponding to the position of the motor, and then instructing start of the automatic column setting control with the operation panel 83 or the remote controller 87.

First, in step S10, a motor presence/absence information preparing subroutine is executed. The motor presence/absence information preparing subroutine is executed for each of the shelves 13a to 13f in the respective rows in order.

Figure 10:
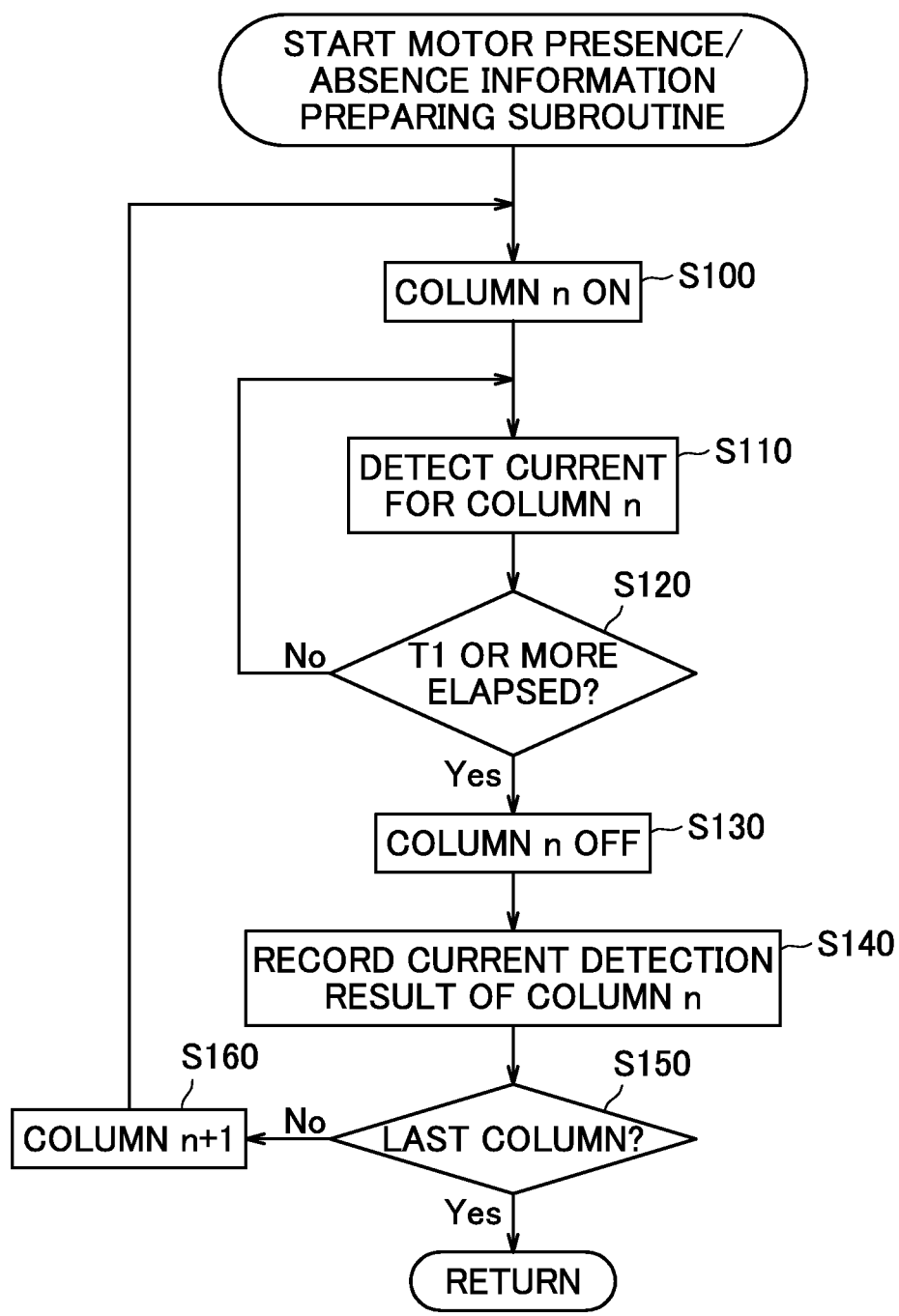
FIG. 10 is a flowchart showing a control procedure in a motor presence/absence information preparing subroutine.

In the motor presence/absence information preparing subroutine, as shown in FIG. 10, first in step S100, the motor 61 with the column number n is energized. The column number n indicates n=1 at start of the present subroutine. Then, the subroutine advances to step S110.

In the step S110, current is detected for the column number n. Then, the subroutine advances to step S120.

It is determined in the step S120 whether or not a predetermined time T1 or more elapses after start of the energization to the motor 61 with the column number n in the step S100. The predetermined time T1 is a little time to such an extent that the dispensing mechanism 55 is not driven, and may be, for example, several milliseconds. When the predetermined time T1 or more elapses, the subroutine advances to step S130. When the predetermined time T1 or more does not elapse, the subroutine returns to the step S110.

In the step S130, the energization to the motor 61 with the column number n is stopped. Then, the subroutine advances to step S140.

In the step S140, the detection result of the current value of the motor 61 with the column number n detected in the step S110 is recorded in the memory 84a. Note that as the detection result of the current value of the motor 61, a result indicating whether or not the current flows may be recorded. When the current flows, it is indicated that the motor 61 is connected to the connector 85 with the column number n, i.e., the motor 61 is provided in the column number n. On the other hand, when any current does not flow, it is indicated that the motor 61 is not connected to the connector 85 with the column number n, i.e., the motor 61 is not provided in the column number n. Then, the subroutine advances to step S150.

In the step S150, it is determined whether or not the existing column number n indicates the rightmost last column 72 in each shelf 13, for example, whether or not n=6, when the shelf is the first shelf 13a in the top row. When the column number n indicates the last column 72, the present subroutine ends. Note that the present subroutine shown in FIG. 10 is executed for each shelf 13. For example, when the shelves 13 are provided in six rows, the present subroutine is executed six times in total. Then, the present subroutine ends, to advance to step S20 of a main routine shown in FIG. 9. When the column number n does not indicate the last column 72, the subroutine advances to step S160.

In the step S160, it is determined that n=n+1. Then, the subroutine returns to the step S100.

Note that the motor presence/absence information preparing subroutine is controlled by the motor presence/absence information preparing section 81, which corresponds to a position detector of the present invention.

In the step S20 of FIG. 9, the presence/absence information of the motor 61 is displayed. Then, the routine advances to step S30. As the presence/absence information of the motor 61, for example, as shown in FIG. 11, circled column numbers are displayed in order from a left side in column number display 90 for each of shelf numbers 1 to N (in the present embodiment, N=6) in the operation panel 83, and the column numbers are displayed in different colors, for example, the column 72 in which the motor 61 is present is displayed in a white circle, and the column 72 in which the motor 61 is absent is displayed in gray. FIG. 11 shows a column number 1 (01 is displayed) in which the motor 61 is present, a column number 2 (02 is displayed) in which the motor 61 is absent, a column number 3 (03 is displayed) in which the motor 61 is present, a column number 4 (04 is displayed) in which the motor 61 is absent, a column number 5 (05 is displayed) in which the motor 61 is present, and a column number 6 (06 is displayed) in which the motor 61 is absent from the left in the shelf 13a of a first row (a shelf number 1: shelf 1 is displayed).

In the step S30, a pattern extraction/setting subroutine is executed. The pattern extraction/setting subroutine is executed in order for the shelf 13 in each row. Note that it is set that a shelf number N=1 at start of the present subroutine.

In the pattern extraction/setting subroutine, as shown in FIG. 12, first in step S200, pattern extraction of the shelf number N starts to be executed. Furthermore, the column number n is set to a leftmost column number of the shelf number N. Then, the subroutine advances to step S210.

In the step S210, the motor presence/absence information stored in the memory 84a is read for the column numbers n, n+1 and n+2 of the shelf number N. For example, first in the shelf 13a (the shelf number 1), the motor presence/absence information of the column number 1, the column number 2 and the column number 3 are first read and obtained. Then, the subroutine advances to step S220.

In the step S220, it is determined whether or not the motor presence/absence information of the column number n read in the step S210 matches the pattern a of single column type of motor presence/absence information shown in FIG. 7(a). When the information matches the pattern a, the subroutine advances to step S230. When the information does not match the pattern a, the subroutine advances to step S240.

In the step S230, it is presumed that the column number n indicates the single column type, specifically the single column type of dispensing mechanism 55a is installed in the column number n, and this presumption result is temporarily stored (single setting). Then, the subroutine advances to the step S240.

In the step S240, it is determined whether or not the motor presence/absence information of the column numbers n and n+1 read in the step S210 matches the pattern b of left drive double column type of motor presence/absence information shown in FIG. 7(b). When the information matches the pattern b, the subroutine advances to step S250. When the information does not match the pattern b, the subroutine advances to step S260.

In the step S250, it is presumed that the column numbers n, n+1 correspond to the left drive double column type, specifically the left drive double column type of dispensing mechanism 55*b* is installed in each of the column numbers n, n+1, and the presumption result is temporarily stored (double setting). Then, the subroutine advances to the step S260.

In the step S260, it is determined whether or not motor presence/absence information of the column numbers n, n+1, n+2 read in the step S210 matches the pattern c of central drive triple column type of motor presence/absence information shown in FIG. 7(*c*). When the information matches the pattern c, the subroutine advances to step S270. When the information does not match the pattern c, the subroutine advances to step S280.

In the step S270, it is presumed that the column numbers n, n+1, n+2 correspond to the central drive triple column type, specifically the central drive triple column type of dispensing mechanisms 55*c* is installed in each of the column numbers n, n+1, n+2, and the presumption result is temporarily stored (triple A setting). Then, the subroutine advances to the step S280.

In the step S280, it is determined whether or not the motor presence/absence information of the column numbers n, n+1, n+2 read in the step S210 matches the pattern d of left drive triple column type of motor presence/absence information shown in FIG. 7(*d*). When the information matches the pattern d, the subroutine advances to step S290. When the information does not match the pattern d, the subroutine advances to step S300.

In the step S290, it is presumed that the column numbers n, n+1, n+2 correspond to the left drive triple column type, specifically the left drive triple column type of dispensing mechanism 55*d* is installed in each of the column numbers n, n+1, n+2, and the presumption result is temporarily stored (triple B setting). Then, the subroutine advances to the step S300.

In the step S300, it is set that the column number n=n+1. Then, the subroutine advances to step S310.

In the step S310, it is determined whether or not the existing column number n indicates the rightmost last column 72 in the shelf number N, for example, whether or not n=6, when the shelf is the first shelf 13*a* in the top row. When the column number n indicates the last column 72, the subroutine advances to step S320. When the column number n does not indicate the last column 72, the subroutine returns to the step S210.

In the step S320, the shelf number N is set to N+1. Then, the subroutine advances to step S330.

In the step S330, it is determined whether or not the shelf number N indicates the last shelf. That is, in the present embodiment, it is determined whether or not N=6. When the shelf number N indicates the last shelf, the subroutine advances to step S340. When the shelf number N does not indicate the last shelf, the subroutine returns to the step S200.

In the step S340, column patterns presumed and temporarily stored (extracted) in the steps S230, S250, S270 and S290 are associated with the column numbers and all stored in the memory 84*a*. Then, the pattern extraction/setting subroutine ends, to advance to step S40 of the main routine.

Note that the pattern extraction/setting subroutine is controlled by the pattern extracting section 82, which corresponds to the determining section of the present invention.

In the step S40, in all the shelves 13, column pattern candidates stored in the memory 84*a* are displayed in the operation panel 83. For example, as shown in FIG. 13, circled column numbers are arranged in a row in the right-left direction and displayed for each of shelf number 1 to shelf number N in the operation panel 83 (column number display 90). Note that in the present embodiment, six columns 72 are present in each of six rows of shelves, and hence, the column number display 90 in which six column numbers are arranged in the right-left direction is shown in each of the six rows. Furthermore, the column pattern candidates are shown in rectangular bar display 91 under the column number display 90. As for display of the column pattern candidates, the candidates are displayed separately in different modes such as different colors or patterns in accordance with types (a to d) of column patterns. For example, in FIGS. 13, 14, a column pattern b is shown by hatching of upward diagonal lines, and a column pattern c is shown by hatching of downward diagonal lines in the bar display 91. Additionally, display of a column pattern a is omitted, and a determined column pattern is shown in the bar display 91 in black.

As shown in the first row of shelf (the shelf number 1) of FIG. 11, when the motor 61 is present in the column number 1, the motor 61 is absent in the column number 2, the motor 61 is present in the column number 3, the motor 61 is absent in the column number 4, the motor 61 is present in the column number 5 and the motor 61 is absent in the column number 6, it is presumed that the candidates for the column patterns correspond to combinations of the following three patterns 1) to 3) as shown in a shelf number 1 of FIG. 13.

1) Column numbers 1 and 2 correspond to the pattern b, column numbers 3 and 4 correspond to the pattern b, and column numbers 5 and 6 correspond to the pattern b.
2) The column number 1 corresponds to the pattern a, the column numbers 2, 3 and 4 correspond to the pattern c, and the column numbers 5 and 6 correspond to the pattern b.
3) The column numbers 1 and 2 correspond to the pattern b, the column number 3 corresponds to the pattern a, and column numbers 4, 5 and 6 correspond to the pattern c.

Therefore, in the shelf number 1, three rows of bar display 91 are displayed. Note that as for the bar display 91, all may be displayed. When pattern display is not the same for each shelf as shown in FIG. 13, the bar display 91 including a large number of columns may only be shown, and a part of the bar display 91 may be omitted.

Furthermore, as for the column number display 90, a determined column number and a non-determined column number are displayed, for example, in different circle colors. In FIG. 13, in the shelf number 1, there are the above three patterns 1) to 3) of the column pattern candidates as to the column numbers 1 to 6, and the columns are not determined in one pattern. Therefore, the column numbers are displayed in gray. Additionally, as shown in FIG. 11, when it is detected that the motor 61 is absent in a first column number N1 from left of the shelf number N, the motor 61 is present in a second column number N2 from the left and the motor 61 is absent in a third column number N3 from the left, the column numbers N1, N2 and N3 correspond only to the column pattern c, and the other column patterns a, b and d do not correspond. Therefore, the column numbers N1, N2 and N3 are determined in the column pattern c. When the column pattern is determined in this manner, the bar display 91 in black is shown below the column numbers N1, N2 and N3, for example, as shown in FIG. 13. For the column number display 90 of the column numbers N1, N2 and N3, hatching of downward diagonal lines that is a mode of the column pattern c is shown.

As described above, set (extracted) column patterns are shown by the bar display 91 for all the shelf numbers 1 to N. Then, the routine advances to step S50. Note that when the column number display 90 and the bar display 91 of all the shelf numbers 1 to N cannot be shown in the operation panel 83, scroll display may be shown.

In the step S50, it is determined whether or not combination conflict of the column patterns is absent, that is, whether or not there is only one combination of the column patterns for each shelf 13. When the combination conflict is absent, that is, when only one combination of the column patterns is extracted for each shelf 13, the present routine ends. When there is the combination conflict, that is, when there are a plurality of column pattern combinations and the column pattern cannot be determined as in the above shelf number 1, the routine advances to step S60.

In the step S60, as for the shelf with the conflict, the combination is selected. To select the combination, the column number display 90 shown in the operation panel 83 is pushed, and a setting switch 92 is pushed to determine the combination. For example, when the column numbers are displayed as shown in the shelf number 1 of FIG. 13 and the column numbers 1 and 2 correspond to the column pattern b, the column number display 90 of the column number 1 and the column number 2 is pushed and the setting switch 92 is pushed. Consequently, the column pattern b is determined for the column numbers 1 and 2. Then, as shown in FIG. 14, the bar display 91 in black is shown below the column number display 90 of the column number 1 and the column number 2, and the column number display 90 of the column number 1 and the column number 2 is shown by hatching of upward diagonal lines that is a display mode of the column pattern b. In this state, the column pattern of the column number 1 and the column number 2 is determined, but column patterns of column numbers 3 to 6 are not determined yet.

Next, for example, when the column number 3 corresponds to the column pattern a and the column numbers 4 to 6 correspond to the column pattern c, the column number display 90 of the column numbers 4 to 6 is pushed and the setting switch 92 is pushed. Then, it is determined that the column numbers 4 to 6 correspond to the column pattern c. Consequently, as shown in FIG. 15, the bar display 91 in black is shown below the column numbers 4 to 6, and the column number display 90 of the column numbers 4 to 6 is shown by hatching of downward diagonal lines that is a display mode of the column pattern c. Furthermore, it is automatically determined that the column number 3 corresponds to the column pattern a. Note that the column number 3 may be pushed to make determination. Consequently, it is determined that the column number 3 corresponds to the column pattern a, and it is automatically determined that the column numbers 4 to 6 correspond to the column pattern c.

Furthermore, for example, when the column numbers 3 and 4 correspond to the column pattern b and the column numbers 5 and 6 also correspond to the column pattern b from a state where the column pattern of the column number 1 and the column number 2 is determined as shown in FIG. 14, the column number display 90 of the column numbers 3 and 4 is pushed and the setting switch 92 is pushed, to determine that the column numbers 3 and 4 correspond to the column pattern b. Consequently, as shown in FIG. 16, the bar display 91 in black is shown below the column number display 90 of the column numbers 3 and 4, and the column number display 90 of the column numbers 3 and 4 is shown by hatching of upward diagonal lines that is the mode of the column pattern b. Additionally, it is automatically determined that the column numbers 5 and 6 correspond to the column pattern b, the bar display 91 in black is similarly shown, and the column number display 90 is shown by hatching.

Note that an operation of pushing the column number display 90 and the setting switch 92 to determine the column pattern may be performed from any column 72. Then, the routine returns to the step S30.

By the above described control, the presence/absence information of the motor 61 is obtained for each of the shelves 13 (the shelf numbers 1 to N), and a column pattern to be uniquely determined can be automatically determined. When there is the conflict of the combinations of the column patterns and the column pattern cannot be automatically determined, the column pattern is determined by the operation of selecting and determining the column number from the candidates for the column pattern that are displayed in the column number.

In a case where the column patterns are limited to four types of (a) to (d) and there are six columns 72 in one shelf 13 as in the present embodiment, there are 37 combinations of the column patterns as shown in FIG. 17. Note that in FIG. 17, S indicates the column pattern a, D indicates the column pattern b, TA indicates the column pattern c, and TB indicates the column pattern d.

As shown in J of FIG. 17, the presence/absence information of the motor 61 is the same for combination pattern No. 7 and combination pattern No. 24. As shown in K, the presence/absence information of the motor 61 is the same for combination pattern No. 12 and combination pattern No. 26. As shown in L, the presence/absence information of the motor 61 is the same for combination pattern No. 13, combination pattern No. 29, and combination pattern No. 30. As shown in M, the presence/absence information of the motor 61 is the same for combination pattern No. 19 and combination pattern No. 28. As shown in N, the presence/absence information of the motor 61 is the same for combination pattern No. 23 and combination pattern No. 31. Then, with presence/absence information of the motor 61 that is different from the above presence/absence information, the column pattern is limited to one type.

Therefore, in a case where the presence/absence information of the motor 61 corresponds to a pattern other than the patterns shown in the above K to N, the column pattern is automatically determined. In a case where the presence/absence information of the motor 61 corresponds to one of the patterns shown in K to N, it is considered that there are a plurality of column patterns. Therefore, a plurality of bar displays 91 are shown in the operation panel 83, and thereby it is warned that the column pattern cannot be determined. In this case, for the column 72 in which column pattern cannot be determined, the manager performs a determining operation of pushing the column number and the setting switch 92, to determine the column pattern. In the present embodiment, most presence/absence information of the motor 61 corresponds to one column pattern, and is limited to three types of column patterns at most. Therefore, the column pattern for one shelf 13 is determined by performing the determining operation twice at most.

Column setting information of each shelf 13 that is set in the pattern extracting section 82 is supplied to the control unit 84. The control unit 84 displays buttons in the operation panel 83 based on this column setting information. In the button display, a button may be displayed in accordance with a position and size of the column 72 to be occupied by the dispensing mechanism 55 for each shelf 13. Furthermore, for each button, information such as a type of article, price or the like is set and displayed together in the operation panel 83, for example, with the remote controller, so that a purchaser can easily select the article. Additionally, control may be executed based on the column setting information, and further the information may be used in lighting control, cold temperature control or the like.

As described above, the article vending machine 1 of the present embodiment includes the article storage section 6 that stores the articles. In the shelf 13 of the article storage section, the articles are arranged and carried in the front-rear direction, and the dispensing mechanism 55 is provided to sequentially push out the article forward in accordance with vending request. Each shelf 13 includes the plurality of columns 72 so that the plurality of dispensing mechanisms 55 can be installed. Furthermore, the dispensing mechanisms 55 of the single column type in which one column 72 is used, the double column type in which two columns 72 are used, and the triple column type in which three columns 72 are used can be installed so that the articles having different sizes can be stored.

In a case where the dispensing mechanisms 55 having different sizes are provided in this manner, when changing the dispensing mechanism 55, the manager is required to perform an operation of setting the column 72 by changing the size or position of the operation switch to be displayed in the operation panel 83, and matching each dispensing mechanism 55.

In the present embodiment, connection of the motor 61 of the dispensing mechanism 55 is detected to detect the installation position of the motor 61 in the shelf 13, and a setting situation of the column 72 is automatically determined. Then, in accordance with the setting situation of the column 72, the operation button is displayed in the operation panel 83, so that the setting operation of the column 72 can be easily performed, and an operation of setting the price or the like can be easily performed.

Note that in a case where it is presumed that the columns 72 are automatically set in a plurality of patterns, the column number display 90 and a plurality of bar displays 91 are shown in the operation panel 83, to make warning. In this case, the manager can easily set the column 72 by selecting the column from a plurality of candidates. Furthermore, when the automatic setting of the column 72 is wrong, the setting can be manually changed.

Thus, in the present embodiment, since the presence/absence information of the motor 61 is detected, the column 72 and the dispensing mechanism of one of the column patterns (a) to (d) to be disposed in the column are almost automatically set. Therefore, the column can be more easily set as compared with a case where all column patterns are set.

The present invention is not limited to the above embodiment. For example, in place of the spiral part 57 that is the dispensing section in the dispensing mechanism 55, a belt conveyor or the like may be used. Detailed structures of the drive section and dispensing section of the dispensing mechanism can be suitably changed. The present invention can be broadly adopted in the article vending machine in which the different types of dispensing mechanisms can be installed in the shelves.

EXPLANATION OF REFERENCE SIGNS

1 article vending machine
13 shelf
57 spiral part (a dispensing section)
55 dispensing mechanism
61 motor (a drive section)
72 column
81 motor presence/absence information preparing section (a position detector)
82 pattern extracting section (a determining section)
83 operation panel (a display section, a warning section, and a selecting section)
84 control unit (a control section)

The invention claimed is:

1. An automatic column selling device for an article vending machine, the article vending machine comprising a plurality of columns provided to be arranged in a right-left direction in an article storing shelf, each of the columns configured to store articles arranged in a front-rear direction, and a dispensing mechanism removably installed in the shelf, to sequentially dispense the articles stored in each of the columns based on a vending command, the dispensing mechanism being arbitrarily installable at a plurality of preset right and left positions in the shelf, the automatic column setting device for the article vending machine, comprising:
a position detector that detects an installation position of the dispensing mechanism in the shelf, and
a determining section that determines a setting situation of the column in the shelf based on the installation position of the dispensing mechanism that is detected by the position detector,
wherein the dispensing mechanism comprises a drive section installed to occupy one column or a plurality of adjacent columns, the dispensing mechanism being selected from a plurality of types of dispensing mechanisms that are different in a number of the columns to be occupied by the dispensing section or a relative position of the drive section to the dispensing section,
wherein the position detector is configured to detect the presence or absence of the installed drive section for each column as the installation position of the dispensing mechanism, and
wherein the determining section is configured to determine the type and installation position of the dispensing mechanism as the setting situation of the column based on information on the presence or absence of the installed drive section detected by the position detector.

2. The automatic column setting device for the article vending machine according to claim 1, comprising a warning section that makes warning, in a case where the setting situation of the column is determined in a plurality of patterns.

3. The automatic column setting device for the article vending machine according to claim 1, comprising a display section that displays setting situations of a plurality of patterns, in a case where the determining section determines the setting situation of the column in the plurality of patterns.

4. The automatic column setting device for the article vending machine according to claim 2, comprising a display section that displays setting situations of a plurality of patterns, in a case where the determining section determines the setting situation of the column in the plurality of patterns.

5. The automatic column setting device for the article vending machine according to claim 3, comprising a selecting section that selects and determines an actual setting situation of the column from the setting situations of the plurality of patterns displayed in the display section.

6. The automatic column setting device for the article vending machine according to claim 4, comprising a selecting section that selects and determines an actual setting situation of the column from the setting situations of the plurality of patterns displayed in the display section.

7. The automatic column setting device for the article vending machine according to claim 1, comprising a control section that controls the display section to display information of the articles stored in the column, and an operation button to purchase the article, based on the setting situation of the column that is determined by the determining section.

\* \* \* \* \*